United States Patent [19]

Henning et al.

[11] Patent Number: 4,653,916
[45] Date of Patent: Mar. 31, 1987

[54] OPTICAL SENSING SYSTEMS
[75] Inventors: Michael L. Henning, Somerset; Robert J. Langston, Dorset, both of England
[73] Assignee: Plessey Overseas Limited, Ilford, England
[21] Appl. No.: 804,566
[22] Filed: Dec. 4, 1985
[51] Int. Cl.$^4$ .............................................. G01B 9/02
[52] U.S. Cl. ..................... 356/345; 250/227; 356/349
[58] Field of Search ............... 356/345, 349; 250/227; 73/655, 657

[56] References Cited
U.S. PATENT DOCUMENTS

| | | | |
|---|---|---|---|
| 4,360,272 | 11/1982 | Schmadel et al. | 356/352 |
| 4,517,456 | 5/1985 | Halsall et al. | 250/227 X |
| 4,543,961 | 10/1985 | Brown | 250/227 X |
| 4,545,253 | 10/1985 | Avicola | 250/227 X |

FOREIGN PATENT DOCUMENTS 2126820  3/1984  United Kingdom ................ 356/345

Primary Examiner—Davis L. Willis
Assistant Examiner—Matthew W. Koren
Attorney, Agent, or Firm—Michael F. Oglo; Julian C. Renfro

[57] ABSTRACT

A multiplex optical sensing system comprises an optical fibre arranged to be subjected at the longest length to fibre deforming forces during operation of the system and means for producing a plurality of pulse trains of coherent light in which the frequency of frequencies of (F1+ΔF1), (F2+ΔF2), (F3+ΔF3) of the pulses in respective pulse trains lie within a different frequency channel for transmission along said optical fibre. The optical fibre is provided along its length with a nunber of equally spaced discontinuities which effectively divide the fibre into a plurality of discrete fibre elements so that a small proportion of each light being pulse being transmitted along the fibre will be reflected back along the fibre from each of the discontinuities whereby, within any one of the pulse trains, each reflected light pulse after the first is superimposed upon either the previously reflected pulse from the preceding discontinuity or a reference light signal of the same frequency or a frequency with a constant difference frequency to the said transmitted light signal to produce an electrical signal in square law photo-detection means, the difference between respective electrical signals corresponding to successive fibre elements being dependent upon the length of the fibre elements so that changes in optical path length of these elements produced by the incidence of deforming forces will result in changes in the electrical signals which will be detected.

7 Claims, 3 Drawing Figures

OPTICAL SENSING SYSTEMS

This invention relates to optical systems for sensing strain or deformation (e.g. elongation or bending) of various members.

A previously proposed optical sensing system is described in our co-pending patent application No. GB 8220793 (Publication No. 2126820A) in which a coherent light pulse or coherent pulse pairs are launched into an optical fibre which is arranged to be subjected to deforming forces such as acoustic waves. The optical fibre is divided into a plurality of discrete fibre elements so that a small proportion of each coherent light pulse transmitted along the fibre will be reflected back along the fibre at the junction between each of the elements. Reflected light pulses are superimposed in the optical fibre, and after leaving the optical fibre, they are passed to a photo-detection means and decoding means. In response to receiving the pulses, the photo-detection means produces electrical signals indicative of changes in optical path length of the elements due to the incidence of the deforming forces.

This system suffers from the disadvantage that it is necessary to wait for all reflected pulses to leave the optical fibre before launching a further coherent light pulse or pulse pair down the fibre. As a consequence, the sampling rate of the sensing system is limited by the time taken for all reflected pulses to leave the fibre, and so the maximum frequency acoustic wave which can be sensed is also limited. This problem is particularly troublesome in optical sensing systems having a long optical fibre where the optical "round trip" time approaches milliseconds.

It is an aim of the present invention to produce an optical sensing system which can sense acoustic waves having a relatively high frequency even if a long optical fibre is employed in the system.

According to the present invention there is provided a multiplex optical sensing system comprising an optical fibre arranged to be subjected along its length to fibre deforming forces during operation of the system and means for producing a plurality of pulse trains of coherent light in which the frequency or frequencies of the pulses in respective pulse trains lie within a different frequency channel for transmission along said optical fibre, wherein the optical fibre is provided along its length with a number of equally spaced discontinuities which effectively divide the fibre into a plurality of discrete fibre elements so that a small proportion of each light pulse being transmitted along the fibre will be reflected back along the fibre from each of the discontinuities whereby, within any one of the pulse trains, each reflected light pulse after the first is superimposed upon either the previously reflected pulse from the preceding discontinuity or a reference light signal of the same frequency or a frequency with a constant difference frequency to the said transmitted light signal to produce an electrical signal in square law photo-detection means of the system, the difference between respective electrical signals corresponding to successive fibre elements being dependent upon the length of the fibre elements so that changes in optical path length of these elements produced by the incidence of deforming forces will result in changes in the electrical signals which will be detected.

The means for producing a plurality of pulse trains of coherent light in which the frequency or frequencies of the pulses in respective pulse trains lie within a different frequency channel may comprise a laser coupled to an optical frequency shift means. The optical frequency shift means may comprise an integrated optic phase modulator or a Bragg cell, and may be coupled to a driving means which drives the optical frequency shift means thus enabling it to produce pulse trains of coherent light pulses of the desired frequencies appertaining to the respective frequency channels.

Alternatively, each of the plurality of trains of coherent light pulses may be produced by a different laser, each driven by a pulse control means.

In carrying out the present invention a heterodyne system may be used in which the pulse train of each frequency channel comprises two-pulse signals each having two pulses of slightly different frequencies $F_n$ and $F_n + \Delta F_n$ of predetermined duration and time relationship. The two pulses are transmitted along the optical fibre, small proportions of the pulses being reflected back at each fibre discontinuity. The pulse reflected from the second fibre discontinuity is caused to superimpose upon that reflected from the first discontinuity (i.e. the pulse of frequency $F_n$ of the second reflected signal is heterodyned with the pulse of frequency $F_n + \Delta F_n$ of the first reflected pulse). This heterodyning produces a detectable electrical beat frequency signal the modulation of which will vary with changes in length of the first optical fibre element between the first and second optical fibre discontinuities. It will be appreciated that pulses reflected from the third, fourth and fifth and last discontinuities will similarly superimpose upon those pulses reflected from the preceding discontinuity. It will also be appreciated that electrical beat frequency signals will be produced in respect of pulses reflected in each of the frequency channels.

By demultiplexing the electrical beat frequency signals of respective frequency channels and measuring phase modulation of the electrical beat signals corresponding to the respective optical fibre elements between discontinuities for each frequency channel, any changes in optical path length of such elements due to their being stressed can be determined.

Reflected pulses emerging from the optical fibre may be fed into a photo-detection means where the electrical beat frequency signals are produced, and these signals are then fed into a decoding means which demultiplexes the electrical beat frequency signals to provide a separate group of electrical beat frequency signals for each frequency channel, and subsequently demodulates and decodes the groups to provide signals indicative of any changes in the optical path length of fibre elements.

Alternatively, the reflected pulses may be passed from the optical fibre to a demultiplexing means in the form of, for example, a grating which separates the reflected pulses into respective pulse trains appertaining to the respective frequency channels.

In carrying out the present invention, a homodyne system may be used in which reflected pulses of respective pulse trains from the optical fibre discontinuities are homodyned by arranging that, for respective pulse trains, one or two light pulses in predetermined time relationship and of the same frequency are transmitted along the optical fibre. Reflected signals from the respective discontinuities (except the first) are caused to superimpose upon the signals reflected from the preceding discontinuities to produce amplitude modulated electrical signals in dependence upon the lengths of the optical fibre elements. Changes in amplitude produced by changes in length of the optical fibre elements can be detected by respective photo-detection means where electrical beat frequency signals are produced. The electrical beat frequency signals appertaining to respective frequency channels are then passed to a decoding means which provides signals indicative of any changes in length of the optical fibre elements.

As will be fully appreciated from the foregoing the optical sensing system according to the present invention is especially applicable to optical beamforming acoustic wave sensors in which the elements of the optical fibre define an acoustic wave sensor array for use in hydrophones for sonar purposes.

As previously mentioned the present invention has many different applications but because of the non-conductive nature of the optical fibre sensor it would be of particular advantage in explosive gas or vapour environments, such as coal mines, petrol and chemical plants etc.

Embodiments of the present invention are particularly advantageous in that they can sense relatively high frequency acoustic waves since multiplexing the coherent light pulses enables acoustic waves impinging on the optical fibre to be sampled at a higher rate.

The present invention will now be further described by way of example with reference to the accompanying drawings in which.

Figure 1:
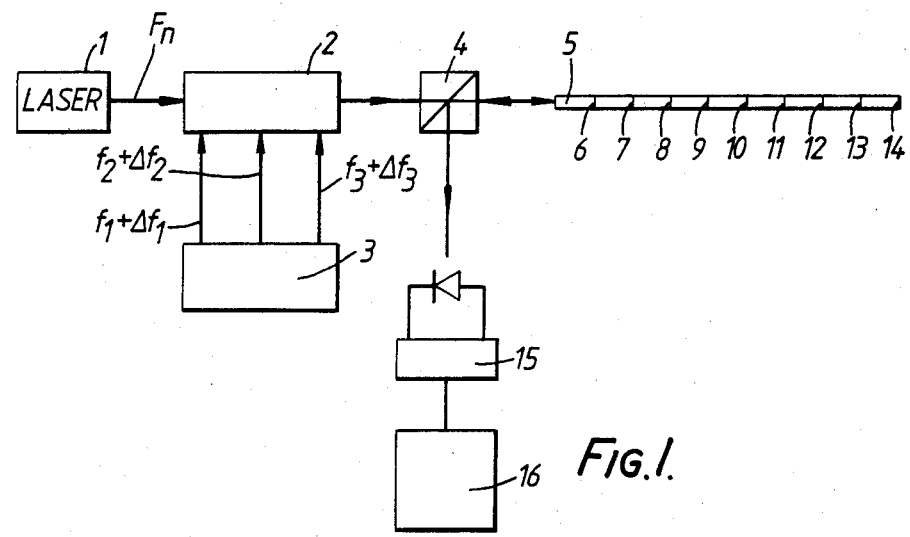
FIG. 1 shows a schematic diagram of a multiplex optical sensing system embodying the present invention.

Referring to FIG. 1 of the drawings, a pulsed laser 1 produces output pulses of coherent light of frequency $F_n$ which are fed into a broadband optical frequency shifter 2 which may be in the form of an integrated optic phase modulator or a Bragg cell. In the case where the shifter 2 is in the form of an integrated optic phase modulator, the pulses passing through the shifter 2 can be shifted in frequency by application of a varying voltage signal to the modulator from a driving means 3. The pulses of coherent light pass through a beam splitter 4 and are focussed into an optical fibre 5. Equispaced discontinuities 6 to 14 are provided along the optical fibre 5 and these discontinuities may, for example, be formed by suitable joints in the optical fibre. The fibre is effectively divided by these discontinuities into eight sensing elements and variations in the lengths of these fibre elements such as due to the impingement thereon of acoustic waves, can be detected and measured in a manner which will be described with reference to FIG. 3 below.

The driving means 3 controls the shifter 2 to produce a plurality of pulse trains of coherent light in which the frequency or frequencies of the pulses in respective pulse trains lie within a different frequency channel. The respective frequency channels are separated in frequency from one another by an amount which enables demultiplexing of the pulse trains of the respective frequency channels after the pulses have emerged from the optical fibre 5.

Figure 3:
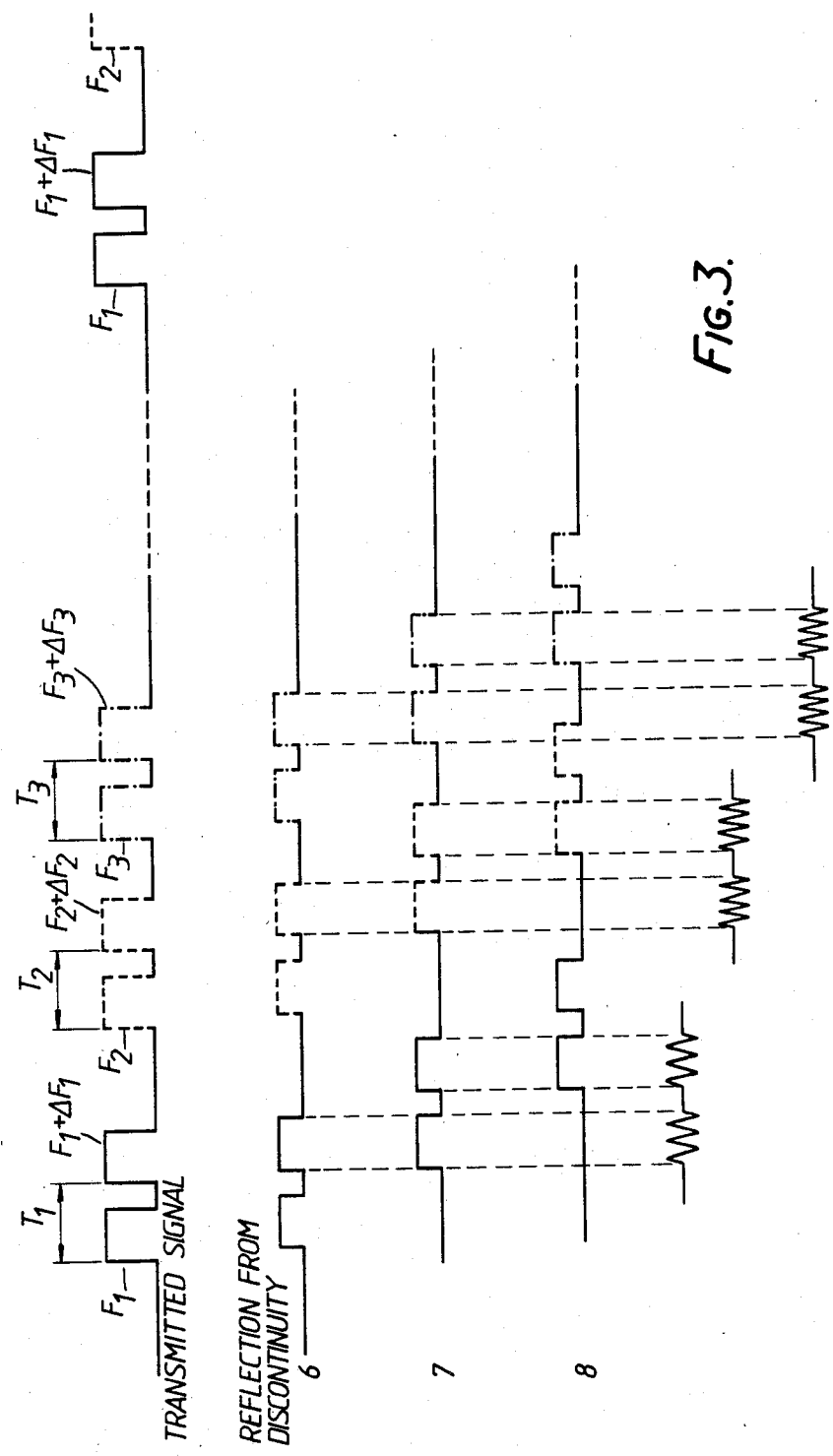
FIG. 3 shows a pulse diagram which will be used to illustrate operation of the embodiment shown in FIG. 1.

In this case, the driving means 3 controls the shifter 2 to produce first, second and third pulse trains of coherent light which comprise pulse pairs of frequencies $F_1$ and $F_1 + \Delta F_1$, $F_2$ and $F_2 + \Delta F_2$, and $F_3$ and $F_3 + \Delta F_3$ respectively as illustrated in FIG. 3.

The first two-pulse light signal which comprises pulse pairs of frequencies $F_1$ and $F_1 + \Delta F_1$, reaches the first optical fibre discontinuity 6 where a small proportion of the signal is reflected back along the fibre 5 to the beam splitter 4 which directs the signal to a square law photo-detection means 15. The remaining part of the two-pulse signal travels on to a discontinuity 7 at which a further small proportion thereof is reflected back along the optical fibre 5 to the detector 15. This procedure continues until that part of the two-pulse signal remaining reaches the last of the optical fibre discontinuities 14 and a small proportion of this signal is again reflected back along the optical fibre to the detector 15. The second two-pulse optical transmission which comprises the pulse pair of frequencies F2 and F2+F2 is made before the first two-pulse signal of frequencies F1 and F1+ΔF1 has left the optical fibre after reflection from the discontinuity 14. The third two-pulse signal follows the pulse pair having frequencies of $F_2$ and $F_2 + \Delta F_2$ and is also transmitted down the optical fibre 5 before the first two-pulse signal has left the opitcal fibre after reflection from the discontinuity 14.

Figure 2:
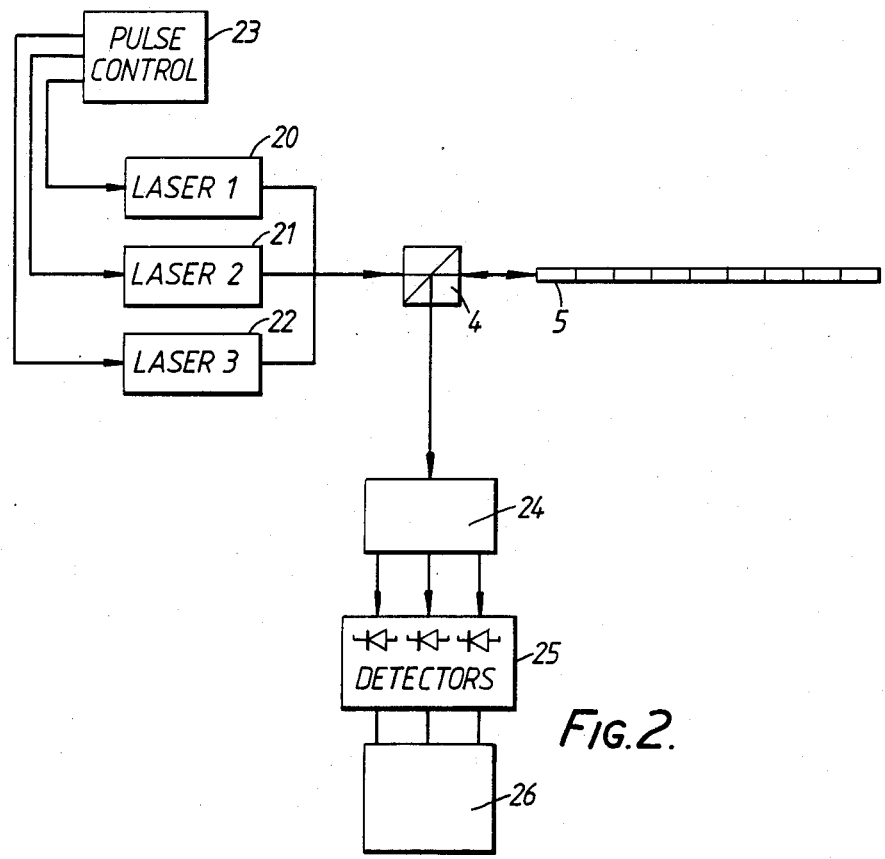
FIG. 2 shows a schematic diagram of a second embodiment of the present invention.

Referring now to FIG. 2, there is shown a second embodiment of the present invention which comprises three lasers 20, 21 and 22 each of which is driven by a pulse control means 23. The control means 23 controls each laser to generate a pulse train, the pulses of respective pulse trains lying within a different frequency channel. The pulse trains are launched into the optical fibre 5 via the beam splitter 3 as described with reference to FIG. 1. The pulse trains reflected from the optical fibre 5 are demultiplexed by means of a grating filter 24. The reflected pulses of respective pulse trains are homodyned by arranging that one or two light pulses in predetermined time relationship and of the same frequency are transmitted along the optical fibre 5. Reflected signals from the respective discontinuities, except the first, are caused to superimpose upon the signals reflected from the preceding discontinuities to produce amplitude modulated electrical signals in dependence upon the lengths of the optical fibre elements. Changes in amplitude produced by changes in length of the optical fibre elements are detected by respective detectors in a square law photo-detection means 25. Electrical beat frequency signals corresponding to respective frequency channels are passed to a decoding means 26 which provides signals indicative of any changes in length of the optical fibre elements.

Referring now to FIG. 3 of the drawings, this shows by way of example reflections of the two-pulse signals from the discontinuities 6, 7 and 8 for each of the three frequency channels in the heterodyne system shown in FIG. 1. As can be seen from the drawing, reflection from the second discontinuity 7 in the present example is delayed with respect to the reflection from the first discontinuity 6 by time $T_1$, $T_2$ and $T_3$ for respective frequency channels, where: $T = 2L/C_G$ where $L =$ to the length of each optical fibre element and $C_G =$ velocity if light in the optical fibre.

By appropriate choice of length L the delay between the reflections is such that there is total coincidence or at least some overlap between the reflected pulse of frequency $F_n$ (where $n = 1$, 2 or 3) of a later reflected pulse with the pulse of frequency $F_n + \Delta F_n$ of the preceding reflected signal. Hence, the pulse reflected from the second fibre discontinuity 7 is caused to superimpose upon that reflected from the first discontinuity (i.e.

the pulse of frequency $F_n$ of the second reflected signal is heterodyned with the pulse of frequency $F_n+\Delta F_n$ of the first reflected pulse). This heterodyning produces a detectable electrical beat frequency signal the modulation of which will vary with changes in length of the first optical fibre element between the first and second optical fibre discontinuity.

By multiplexing the pulse trains in optical systems such as the ones described above, it is possible to sample impinging acoustic waves at a higher rate since a plurality of pulse trains can be transmitted down the optical fibre contemporaneously. This makes the system particularly suitable for detecting acoustic waves having a relatively high frequency.

What is claimed is:

1. A multiplex optical sensing system comprising an optical fibre arranged to be subjected along its length to fibre deforming forces during operation of the system and means for producing a plurality of pulse trains of coherent light in which the frequency or frequencies of the pulses in respective pulse trains lie within a different frequency channel for transmission along said optical fibre, wherein the optical fibre is provided along its length with a number of equally spaced discontinuities which effectively divide the fibre into a plurality of discrete fibre elements so that a proportion of each light pulse being transmitted along the fibre will be reflected back along the fibre from each of the discontinuities whereby, within any one of the pulse trains, each reflected light pulse after the first is superimposed upon either the previously reflected pulse from the preceding discontinuity or a reference light signal of the same frequency or a frequency with a constant difference frequency to the said transmitted light signal to produce an electrical signal in square law photo-detection means of the system, the difference between respective electrical signals corresponding to successive fibre elements being dependent upon the length of the fibre elements so that changes in optical path length of these elements produced by the incidence of deforming forces will result in changes in the electrical signals which will be detected.

2. A multiplex optical sensing system according to claim 1, wherein the means for producing a plurality of pulse trains of coherent light in which the frequency or frequencies of the pulses in respective pulse trains lie within a different frequency channel comprises a laser coupled to an optical frequency shift means, which optical frequency shift means comprises an integrated optic phase modulator or a Bragg cell, and is coupled to a driving means which drives the optical frequency shift means thus enabling it to produce pulse trains of coherent light pulses of the desired frequencies appertaining to the respective frequency channels.

3. A multiplex optical sensing system according to claim 1, wherein each of the plurality of trains of coherent light pulses is produced by a different laser, each driven by a pulse control means.

4. A multiplex optical sensing system according to claim 1, claim 2 or claim 3, wherein a heterodyne system is used in which the pulse train of each frequency channel comprises two-pulse signals each having two pulses of slightly different frequencies $F_n$ and $F_n+\Delta F_n$ of predetermined duration and time relationship, the two pulses being transmitted along the optical fibre, small proportions of the pulses being reflected back at each fibre discontinuity so that the pulse reflected from the second fibre discontinuity is caused to superimpose upon that reflected from the first discontinuity, thereby to produce a detectable electrical beat frequency signal the modulation of which will vary with changes in length of the first optical fibre element between the first and second optical fibre discontinuities.

5. A multiplex optical sensing system according to claim 4, wherein reflected pulses emerging from the optical fibre are fed into a photo-detection means where the electrical beat frequency signals are produced, and these signals are then fed into a decoding means which demultiplexes the electrical beat frequency signals to provide a separate group of electrical beat frequency signals for each frequency channel, and subsequently demodulates and decodes the groups to provide signals indicative of any changes in the optical path length of fibre elements.

6. A multiplex optical sensing system according to claim 4, wherein the reflected pulses may be passed from the optical fibre to a demultiplexing means which separates the reflected pulses into respective pulse trains appertaining to the respective frequency channels.

7. A multiplex optical sensing system according to claim 1, wherein a homodyne system is used in which reflected pulses of respective pulse trains from the optical fibre discontinuities are homodyned by arranging that, for respective pulse trains, one or two light pulses in predetermined time relationship and of the same frequency are transmitted along the optical fibre, reflected signals from the respective discontinuties except the first are caused to superimpose upon the signals reflected from the preceding discontinuities to produce amplitude modulated electrical signals in dependence upon the lengths of the optical fibre elements, and changes in amplitude produced by changes in length of the optical fibre elements can be detected by respective photo-detection means where electrical beat frequency signals are produced, the electrical beat frequency signals appertaining to respective frequency channels then being passed to a decoding means which provides signals indicative of any changes in length of the optical fibre elements.

* * * * *